US00RE43072E

(19) United States
(12) Reissued Patent
Opolka

(10) Patent Number: US RE43,072 E
(45) Date of Reissued Patent: Jan. 10, 2012

(54) SPOTLIGHT

(75) Inventor: Rainer Opolka, Solingen (DE)

(73) Assignee: Zweibruder Optoelectronics GmbH, Solingen (DE)

() Term: 14 Years**

(21) Appl. No.: 29/322,228

(22) Filed: Jul. 31, 2008

Related U.S. Patent Documents

Reissue of:
(64) Patent No.: Des. 571,489
Issued: Jun. 17, 2008
Appl. No.: 29/227,107
Filed: Mar. 28, 2005

(30) Foreign Application Priority Data

Sep. 30, 2004 (EM) ..... 000237805

(51) LOC (9) Cl. ..... 26-02
(52) U.S. Cl. ..... D26/2
(58) Field of Classification Search ..... D26/1–4; 313/313, 315, 317, 493; 315/52–53, 56–58
See application file for complete search history.

(56) References Cited

U.S. PATENT DOCUMENTS 4,345,178 A * 8/1982 Pappas et al. ..... 313/113
D339,647 S * 9/1993 Kawashima et al. ..... D26/24
D408,310 S * 4/1999 Hashizume ..... D10/111
D497,439 S * 10/2004 Shaw et al. ..... D26/2
D518,191 S * 3/2006 Griffin ..... D26/1
D551,784 S * 9/2007 Krieglmeyer et al. ..... D26/2
D556,348 S * 11/2007 Foo ..... D26/2
D581,555 S * 11/2008 To et al. ..... D26/2
D593,222 S * 5/2009 To et al. ..... D26/2
D594,997 S * 6/2009 Zhu et al. ..... D26/2
D601,275 S * 9/2009 Ho et al. ..... D26/2
D630,775 S * 1/2011 Pan ..... D26/2
D631,574 S * 1/2011 Yoshinobu et al. ..... D26/2
D631,575 S * 1/2011 Yoshinobu et al. ..... D26/2
D631,576 S * 1/2011 Yoshinobu et al. ..... D26/2
D636,904 S * 4/2011 Leahy et al. ..... D26/2
D636,905 S * 4/2011 Leahy et al. ..... D26/2
D636,906 S * 4/2011 Leahy et al. ..... D26/2
D640,805 S * 6/2011 Li et al. ..... D26/2
7,982,402 B2 * 7/2011 Johnsen et al. ..... 315/57

* cited by examiner

*Primary Examiner* — Sandra Snapp
(74) *Attorney, Agent, or Firm* — Andrew Wilford

(57) CLAIM

The ornamental design for a spotlight, as shown and described.

DESCRIPTION

FIG. 1 is a perspective view of a spotlight showing my new design;
FIG. 2 is a front elevational view thereof;
FIG. 3 is a bottom plan view thereof; and,
FIG. 4 is a top plan view thereof.

1 Claim, 2 Drawing Sheets

Matter enclosed in heavy brackets [ ] appears in the original patent, but forms no part of this reissue; matter printed in italics indicates the additions made by reissue.

*(Amended)*

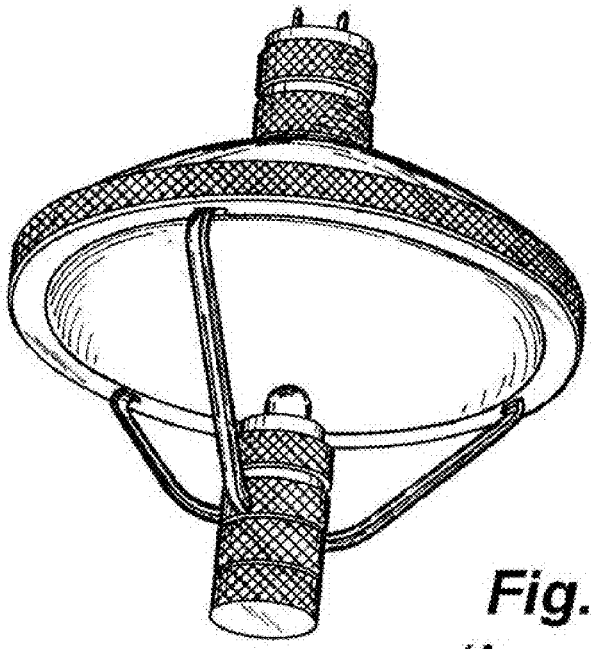
Fig. 1
(Amended)
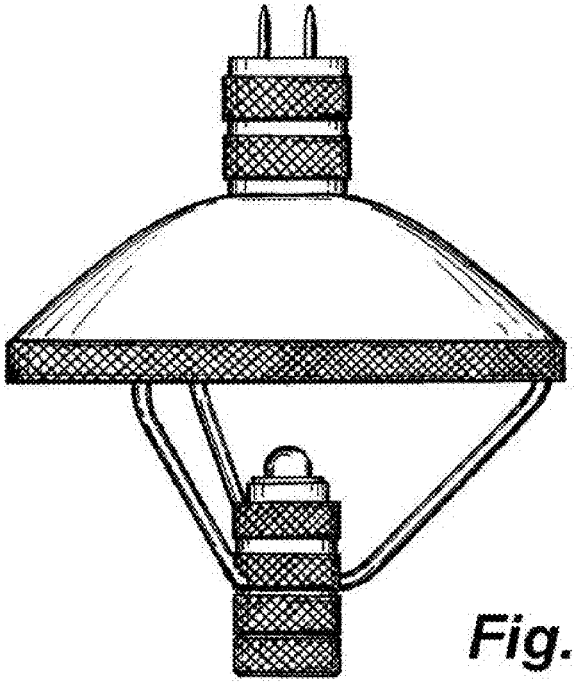
Fig. 2
(Amended)

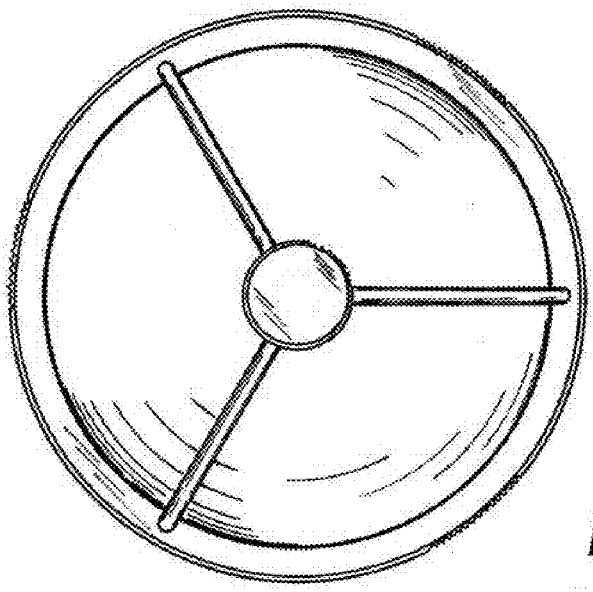
Fig. 3
(Amended)
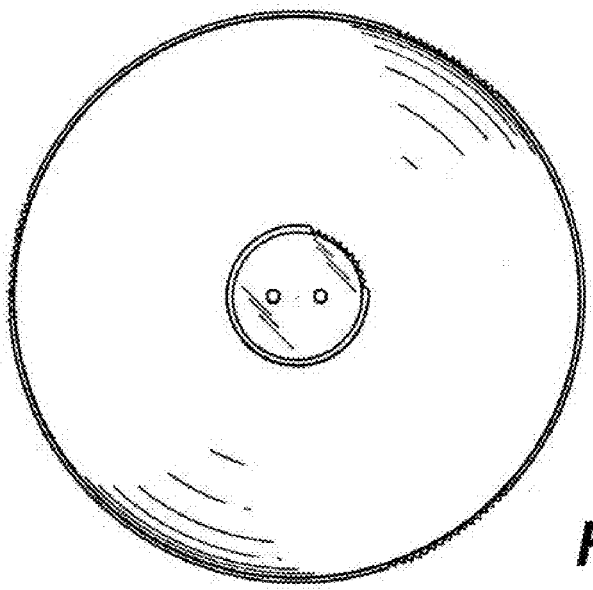
Fig. 4
(Amended)